United States Patent
Clark-Dickson

[19]

[11] Patent Number: 6,012,756
[45] Date of Patent: Jan. 11, 2000

[54] UV50+PROTECTOR-PRAM/STROLLER/ CAPSULE COVERS

[75] Inventor: Karen Joan Clark-Dickson, Windsor, Australia

[73] Assignee: Karen Clark-Dickson, NSW, Australia

[21] Appl. No.: 09/126,362

[22] Filed: Jul. 30, 1998

Related U.S. Application Data

[60] Provisional application No. 60/080,751, Apr. 6, 1998.

[51] Int. Cl.⁷ ........................................................ B60J 9/00
[52] U.S. Cl. ................ 296/77.1; 296/97.21; 296/107.02; 297/184.13; 5/416
[58] Field of Search ............................ 296/107.02, 97.21, 296/77.1, 97, 80, 82, 136, 81, 83, 78.1; 280/47.38, 658; 297/184.13; 150/166; D12/129; 5/416

[56] References Cited

U.S. PATENT DOCUMENTS

| | | | |
|---|---|---|---|
| 4,582,355 | 4/1986 | Hall | 296/77.1 |
| 5,184,865 | 2/1993 | Mohtasham et al. | 296/77.1 |
| 5,522,639 | 6/1996 | Jaime | 297/184.13 |
| 5,542,732 | 8/1996 | Pollman | 296/77.1 |
| 5,730,490 | 3/1998 | Mortenson | 297/184.13 |
| 5,785,333 | 7/1998 | Hinkston et al. | 296/77.1 X |
| 5,862,548 | 1/1999 | Gerhart | 5/93.1 |

FOREIGN PATENT DOCUMENTS

| | | | |
|---|---|---|---|
| 654932 | 7/1994 | Australia | 296/77.1 |

OTHER PUBLICATIONS

The Baby Shade, Juvenile Merchandising Oct. 1998.

*Primary Examiner*—D. Glenn Dayoan
*Assistant Examiner*—Jason Morrow

[57] ABSTRACT

A device has a flexible UV protective cover configured so that on attachment to the edge of the hood of a hooded pram, stroller or wheel stroller, it provides shade and protection for the occupant. The cover is to be made from UPF 50+ stretch knitted fabrics. The cover has a translucent mesh section that provides shade and allows a baby to see out and adults to see in. The cover can be releasably attached to the stroller by the use of elastic strips, ties or hook and loop fasteners. A shaping component creates an open base (vent) to admit air into/under the cover via a hooped effect at the bottom of cover and is an elasticized rod or PVC coated wire.

1 Claim, 4 Drawing Sheets

UV50+PROTECTOR-PRAM/STROLLER/ CAPSULE COVERS

This application claims benefit of provisional application Ser. No. 60/080,751, filed Apr. 6, 1998.

BACKGROUND OF THE INVENTION

The present invention relates generally to a protective covering to protect an individual from the harmful rays of the sun.

The invention has been developed primarily for use only with a hooded pram or stroller and will be described hereinafter with reference to this application. It would be appreciated, however, that the invention is not limited to this particular field of use.

With the increased awareness of the hole in the ozone layer, skin cancer, sun spots, tumours and other UV related concerns, there has been a world wide movement towards protecting individuals from the harmful. UV rays, created by the sun. Many examples of UV protection exist, for example, some local swimming pools have erected shade cloths to cover part swimming area, local authorities, schools and other organisations have required workers and school children to use suncreen, hats and protective clothing when outdoors.

Similarly, governments have attempted to educate the general public in the necessity of protecting oneself from the sun with the use of campaigns such as "Slip, Slop, Slap" resulting in the general public increasingly using wide brim hats, long sleeve shirts and the like to keep themselves protected from the harmful rays whenever outdoors.

Children are particularly vulnerable to damage from UV radiation. In the early years of childhood the skin is very sensitive and susceptible to damaging UV rays.

Conventional prams and strollers did not and still do not provide adequate UV protection. Indeed up until recently these prams and strollers were not designed with UV protection in mind. They generally only included a hood section adapted to keep the occupant relatively dry during rain. As awareness of the hazards of UV rays increased the hood was incorrectly marketed as both a shield from the rain and from the sun.

It was found, however that although this hood section provided some protection from the elements the hood section did not satisfactorily keep the rain and certainly not direct and reflected sunlight off the occupant. Accordingly, it was generally necessary for a towel or other shade means to be draped over the hood section in an effort to keep out the rain and/or sun. This arrangement not only did not provide adequate protection for the occupant, but it had the effect of restricting airflow to and around the occupant. Furthermore, the occupant may suffer trauma from being enclosed whilst moving, not knowing where they were going or what was around them.

In an effort to stop any trauma caused by the above techniques and to more fully enclose the occupant, some prior art prams and strollers included a protective device hanging from the hood section made of a clear plastic. This device, whilst efficient in protecting an occupant from the rain, however, did not provide sufficient airflow to the occupant. Indeed since the device was transparent, sunlight could reach the occupant heating up the interior quite markedly. Since there was little in the way of air circulating in the interior, a green house effect was created whereby the occupant was both uncomfortable and exposed to the harmful UV rays from the sun.

BRIEF SUMMARY OF THE INVENTION

It is an object of the present invention to overcome or substantially ameliorate at least some of the disadvantages of the prior art.

Accordingly, the invention provides a device for shielding an occupant in a hooded pram/stroller from direct sunlight and light rain, said device comprising:
- a flexible UV protective cover configured so that on attachment to hooded pram/stroller it defines a shaded area;
- mid section of mesh, for occuapant to see out and adult to see in;
- attachment means for releasably fastening said cover to said hooded pram/stroller, and vent means to admit air up into said pram/stroller, via hooped effect.

Preferably, said device is configured for attachment to a hooded pram/stroller wherein said cover extends downwardly from top portion which hangs from said hood and terminates in a lower skirt portion, said skirt portion including shaping means as to provide vent means in the form of an open base to allow air flow into and heat out of said cover.

Preferably, said shaping means comprises an elasticised rod and/or PVC coated stretch wire.

In one particular embodiment the elasticised rods and/or stretch wire have been inserted through channels which are provided in the flexible UV protective cover.

In a number of preferred embodiments the shaping means is provided along the lower most edge of said cover to maintain the shape of said open base. This will then preferably form a generally frustum shape cover.

Advantageously, the device according to one particular embodiment can be securely folded into a raised position to assist in viewing and attending to the occupant.

In another embodiment, the device is configured for attachment to a three wheeled jogger style stroller.

Advantageously in a preferred form the mid mesh section is of two layers that provide 50% to 70% shade.

Preferably in a preferred form the attachment means includes any combination of a plurality of ties, hook and loop fastening strips.

To allow the covers to be used at all times the flexible UV protective device is preferably water-resistant.

Preferably, said protective device is manufactured from UPF50+ rated knit fabric.

Preferably, said knitted fabric is polyamide knit fabric.

BRIEF DESCRIPTION OF THE SEVERAL VIEWS OF THE DRAWINGS

A preferred embodiment of the invention will now be described, by way of example only, with reference to the accompanying drawings in which.

DETAILED DESCRIPTION OF THE INVENTION

Figure 1:
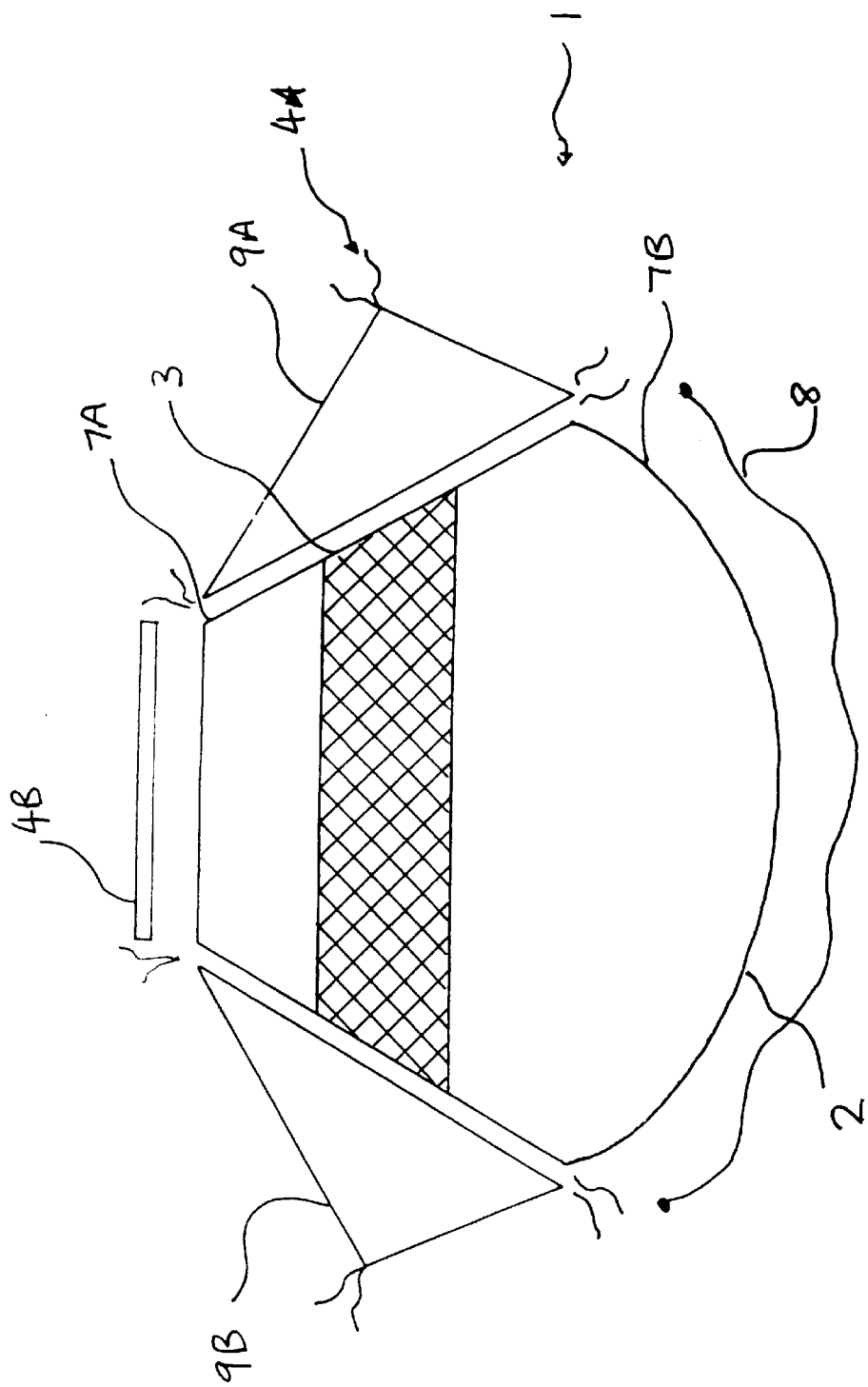
FIG. 1 is a dismantled sectional view showing the pieces involved in manufacturing a first embodiment of the present invention.

Referring to the drawings and in particular to FIG. 1, the invention provides a device 1 for shielding an occupant in a hooded pram/stroller from direct sunlight/light rain and therefore protecting the occupant from UV rays created therefor. The device 1 includes a flexible UV protective cover 2 configured so that on attachment to a hooded pram/stroller it defines a shaded area. The flexible UV protective cover 2 includes a mid mesh section 3 adapted to allow the occupant to view through and be seen through said cover 2. Said cover 2 further includes a top portion 7A, lower skirt portion 7B, and side panels 9A and 9B. The device, as shown in FIG. 1, from several panels including mid mesh section 3, top portion 7A, lower skirt portion 7B, and side panels 9A and 9B which are preferably sewn together as required with any appropriate stitching techniques. The cover 2 further includes attachment means for releasably fastening said cover to said hooded pram/stroller.

FIG. 1 shows two varieties of attachment means, namely ties 4A for tying to the hooded pram/stroller's frame and elasticised strip 4B for releasable connection to the edge of the pram/stroller's hood. When using elastic attachment means 4B, as shown in FIG. 1, said cover 2 hangs from the hood terminating in a lower skirt portion 7B wherein a shaping means 8 is provided so as to create an open base (vent means) to allow airflow into and heat transfer out of said cover. In a preferred embodiment the shaping means 8 includes an elasticised rod, which is inserted through channels housed in the lower skirt portion 7B. This arrangement not only ensures the base stays open but also maintains the general frustum shape of the cover.

Figure 2B:
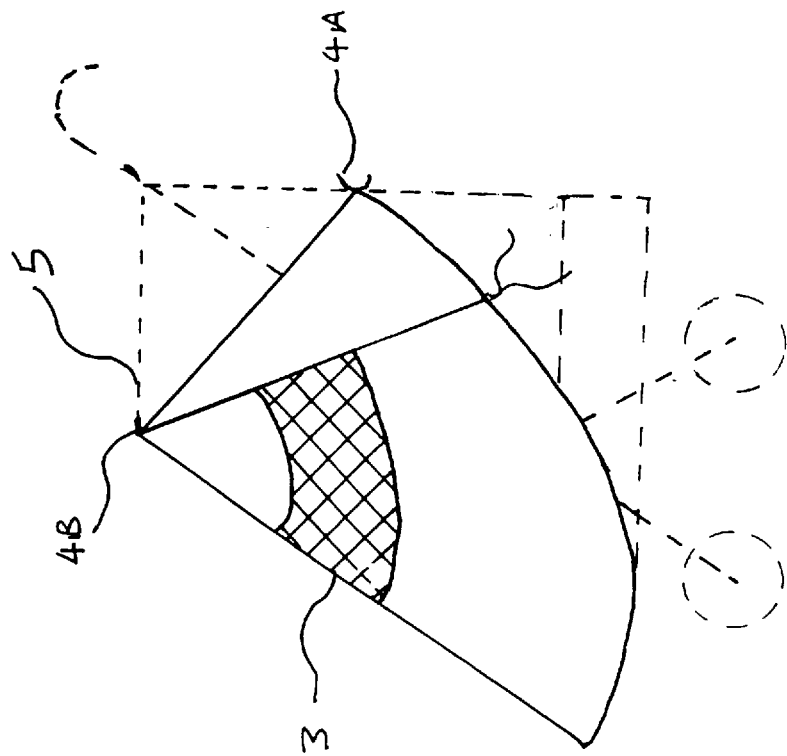
FIG. 2B is a side view of the protective device as shown in FIG. 1.
Figure 2A:
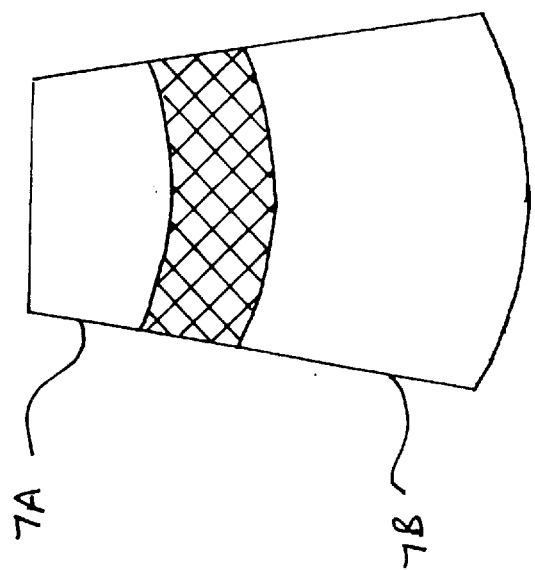
FIG. 2A is a front view showing the protective device of FIG. 1.

FIGS. 2A and 2B show front and side views respectively of the flexible UV protective cover 2 when installed on a regular hooded pram/stroller, an example of which is shown in broken lines. It is noted that as shown in these figures the inventive cover 2 can be arranged such that the occupant is fully shaded. The open base ensures that adequate ventilation and heat transfer is provided at all times. The open base is maintained through the use of the shaping means 8 and is provided at such an angle as to facilitate the free flowing of air into and out of under the cover. The shaping means is preferably provided by an elasticised rod or PVC coated stretch wire.

Figure 3:
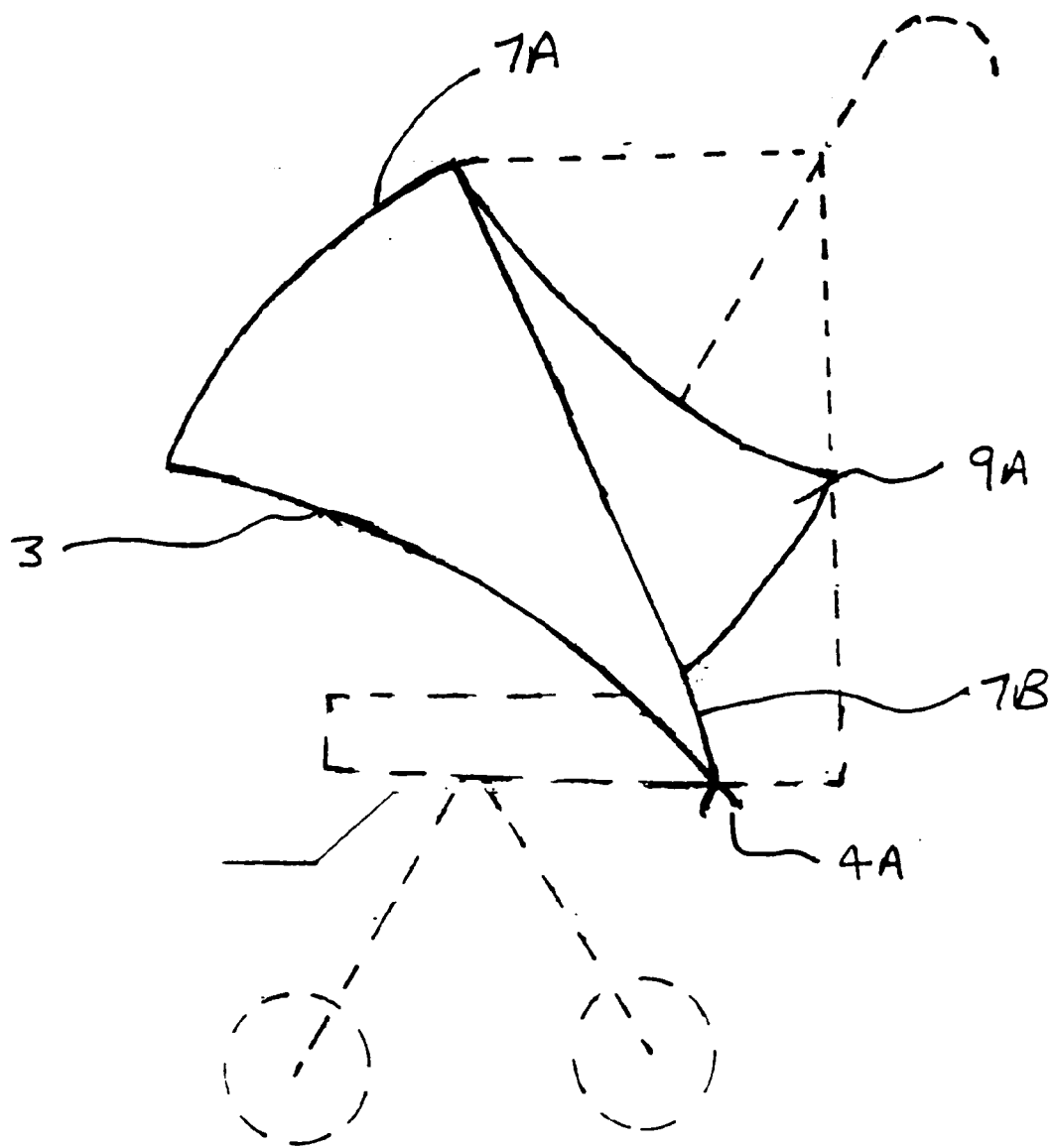
FIG. 3 is a side view of the protective device as shown in FIG. 1 wherein the protective device is in a raised position.

As shown in FIG. 3, the cover 2 may be securely folded into a raised portion to assist in viewing and attending to the occupant.

Figure 4:
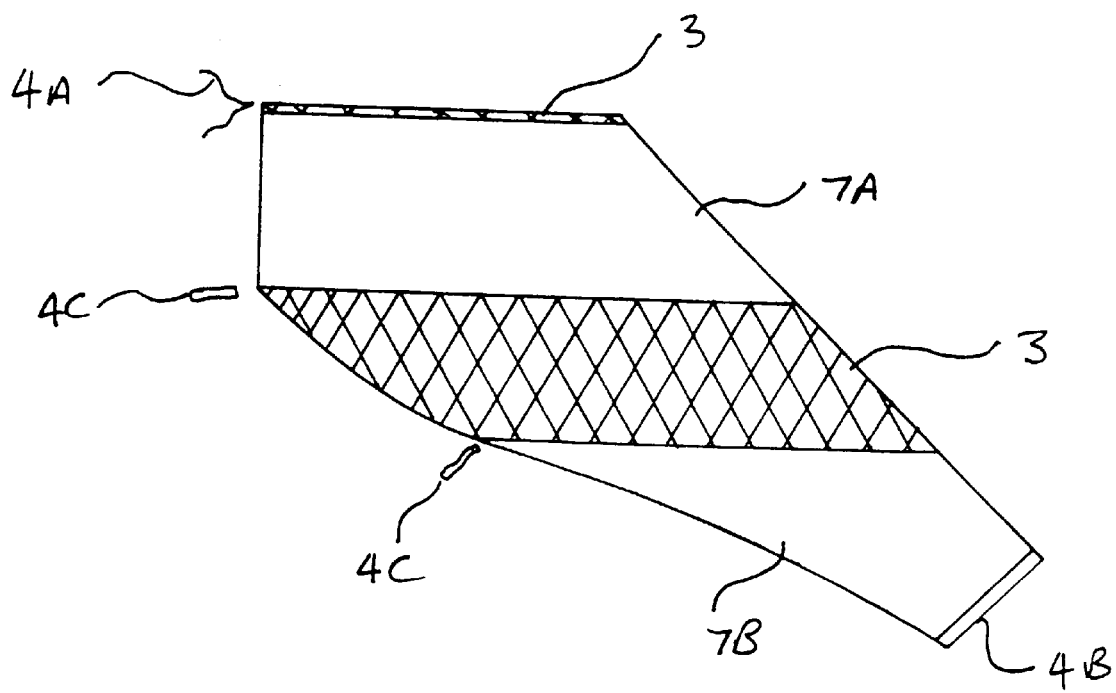
FIG. 4 is an alternative embodiment of the present invention as used with a jogger type pram.

FIG. 4 shows another embodiment of the present invention, which is configured for attachment to a three-wheeled jogger style stroller. It can be seen from this Figure that three types of attachment means are utilised. Attachment means shown in this embodiment include ties 4A at the upper portion, and elasticised strips 4B at the lower portion. The attachment means are assisted by the use of further attachment means 4C in the form of hook and loop fasteners positioned for example along the lateral edges of the device. It should be noted however, that any combination of attachment means may be used in any position to attach the device to the hooded pram/stroller. It should also be noted that in this embodiment the elasticised attachment means 4B is secured at the lower end of the stroller rather than the top end of the stroller as shown in FIGS. 1, 2A and 2B. The embodiment shown in FIG. 4 includes a mid mesh section and top mesh section that attaches the cover to the three wheel stroller. The mid mesh section allows the occupant to see out and adults to see in. The top mesh section provides ventilation.

The cover of the present invention has been designed to assist in the protection of babies and young children while they are "out and about". The cover is preferably manufactured from a UPF50+ rated fabric, ensuring a high level of protection from the sun's rays whilst also being water-resistant. Advantageously, the mid mesh section made of 2 layers of fabric that provides 50% to 70% shade.

The protective device may be easily attached to most hooded prams and strollers by simply placing the elastic attachment means over the edge of the hood of the pram and securing the ties to the frame.

Advantageously, the cover is fully machine washable.

Although the invention has been described with reference to specific Examples, it will be appreciated by those skilled in the art that the invention may be embodied in many other forms.

I claim:

1. A device for shielding an occupant in a hooded stroller from direct sunlight and light rain, said device comprising:
    a flexible UV protective cover configured so that on attachment to the edge of the hood of the stroller it provides shade and protection from precipitation for an occupant of said stroller, said cover being make from UPF50+ stretch knitted fabric,
    a translucent mid mesh section in said UV protective cover providing a substantial amount of shade to the stroller occupant, said cover further having
    attachment means for releasably fastening said cover to the said stroller wherein said attachment means is elastic, ties, or hook and loop fasteners, and
    vent means to admit air under said cover via a hooped effect at the bottom of said cover, said vent means extending in a convex manner away from the stroller creating an aperture between a bottom edge of the cover and the front of the stroller and being comprised of a shaping means wherein said shaping means is an elasticized rod or PVC coated wire.

* * * * *